Patented Oct. 2, 1945

2,385,912

UNITED STATES PATENT OFFICE 2,385,912

SULPHURIZED GLYCERYL ESTERS OF TALL OIL AND METHOD FOR MAKING SAME

Gifford D. Davis, South Orange, and Edwin J. Barth, East Orange, N. J., assignors to National Oil Products Company, Harrison, N. J., a corporation of New Jersey No Drawing. Application June 3, 1943, Serial No. 489,466

5 Claims. (Cl. 260—97.5)

This invention relates to sulphurized compositions, and more particularly to sulphurized products of the glycerides of tall oil acids.

It is well known that various oils, when treated with sulphurizing agents, acquire very desirable lubricating properties, and a wide variety of such materials have been subjected to this treatment in an effort to discover the most desirable and economical compositions of this type. Since oils vary greatly in price, availability and special chemical and physical properties, it will be seen that a considerable field exists for the introduction of novel sulphurized compositions having improved properties and low cost.

It has been discovered by this invention that the glyceryl esters of tall oil may be treated with sulphurizing agents to yield products which are characterized by very desirable lubricating properties, notably oiliness, tenacity, wetting ability and extreme pressure properties, i. e., the ability to lubricate surfaces which are rubbing together under high pressures. The products of this invention may be made by the use of any customary sulphurizing agent, the sulphurizing reaction proceeding smoothly and without untoward side reactions. Moreover, the starting material, the glyceryl esters of tall oil, may be made from readily and cheaply procurable tall oil. By reason of these factors, this invention provides satisfactory and cheap sulphurized products which have come into extensive use in the metal working trades.

The tall oil glyceride starting materials of this invention may be produced by esterifying, with glycerine, any of the various grades of crude, refined and/or distilled tall oils, which are well known products abundantly produced incidentally to the various alkaline wood pulping processes. The esterification of these materials with glycerine to furnish the glyceride starting materials employed in this invention may be effected in accordance with known esterification procedures, one very satisfactory process for this purpose being disclosed in the patent to Segessemann No. 2,278,674, involving a simple heating together of glycerol and tall oil, with or without the presence of a catalyst such as ZnO. On account of the cheapness and abundance of tall oil, and in view of the simplicity of the esterification processes applicable thereto, it is evident that the tall oil glyceryl esters afford a cheap and readily available starting material for use in this invention.

As stated above, any of the usual sulphurizing reagents and procedures are effective in the treatment of tall oil to produce sulphurized compositions according to this invention, treatment with sulphuryl halides, sulphur oxyhalides, active sulphur or elementary sulphur being suitable, the last-named treatment being preferred on account of its simplicity, cheapness and independence of special techniques or apparatus. In general, treatment with elementary sulphur is carried out by agitating and heating the esterified tall oil together with between about 2 and about 20% of sulphur, based on the total charge, at temperatures between about 300° and about 380° F. preferably in the neighborhood of 350° F. for from about 4 to about 10 hours. If only a small amount of sulphur—say from 2% to 5%—is to be incorporated, practically the entire quantity of sulphur may be incorporated at the very beginning of the reaction; on the other hand, when greater proportions of sulphur—say from 7% to 10%—are incorporated, it is preferred to induce the reaction by adding the sulphur in small portions over a period of two hours or so. With greater proportions of sulphur, the addition of sulphur will be carried out over correspondingly longer periods of time; precaution should be taken, however, to avoid undue prolongation of the period of sulphur addition, since undesirable side-reactions are apt to occur when this is done.

Following the sulphurization reaction, the mass is preferably blown with air or an inert gas, so as to remove any disagreeable-smelling volatile material which may have been developed therein.

The resultant sulphurized products are characterized by highly desirable lubricating properties, including oiliness, wetting power, tenacity and extreme pressure properties. The sulphurized products are extensively soluble in a wide variety of paraffinic, and especially naphthenic, lubricating oils, and when so dissolved impart desirable lubricating qualities to the compositions as a whole. Such blends are particularly useful as metal-working oils such as cutting, boring, drilling, sawing, and die lubricants. The products are further useful as ingredients in extreme pressure lubricants for highly stressed machine bearing surfaces, as hypoid gears, clutches, etc. Moreover, the compositions of this invention have the property of forming tenacious films upon the surface of metallic objects, so as to prevent corrosion thereof during processing and/or storage.

Following are exemplary procedures for the manufacture of sulphurized compositions according to this invention, all parts given being by weight.

Example I

| | Parts |
|---|---|
| Glyceryl esters of tall oil | 83 |
| Sulphur | 17 |
| | 100 |

The tall oil esters were heated to 330° F. in a steam jacketed kettle provided with a stirring mechanism, the temperature being maintained, and the stirring being continued, for 4 hours. The sulphur was added gradually during this period according to the schedule:

| | Parts |
|---|---|
| During the first hour | 8 |
| During the next 1½ hours | 4 |
| During the next ½ hour | 2 |
| During the next hour | 2 |

At the end of this 4 hour induction period, the temperature was raised to 350° F., and this temperature maintained and stirring continued for 2 hours to finish the reaction. Thereafter, the batch was cooled to 200° F., and air was blown through the charge for 2 hours to remove any malodorous and unstable by-products of the reaction. Finally, the charge was drained from the vessel and cooled. The product so produced was found to contain the sulphur in firmly combined form, showing no tendency to decompose over long periods of time even at somewhat elevated temperatures.

20 parts of the sulphurized tall oil produced as just described were blended with 80 parts of a naphthenic lubricating oil. The resultant blend was found highly suitable as a lubricant in cutting, milling, sawing, broaching, drawing and like metal-working processes. The blend had, moreover, the property of forming a tenacious film over metallic surfaces treated therewith, so as to prevent corrosion thereof during subsequent processing and storage. The blend was absolutely non-corrosive to metallic surfaces at ordinary temperatures, and made no attack upon copper, steel, or brass surfaces at temperatures as high as 400° F., other than to form a thin, smooth black sulphide film thereon.

Example II

| | Parts |
|---|---|
| Glyceryl esters of tall oil | 91 |
| Sulphur | 9 |
| | 100 |

The tall oil esters and sulphur were mixed cold in a jacketed kettle provided with an agitator. With continued agitation, the temperature of the mass was gradually raised to 250° F. over a period of 1½ hours. Thereafter, with further continued stirring, the temperature was raised to 320° F., which temperature was maintained for 2 hours, at the end of which time the sulphur was completely reacted. The charge was cooled to 200° F. and blown with air for 1 hour. The charge was then drained out and cooled. A blend of 20 parts of the sulphurized product and 80 parts of a paraffinic lubricating oil exhibited substantially the same excellent lubricating properties, anticorrosion properties and stability characteristics of the blend made in accordance with Example I.

Example III

| | Parts |
|---|---|
| Glyceryl esters of tall oil | 95 |
| Sulphur | 5 |
| | 100 |

The above ingredients were reacted together exactly as were the corresponding ingredients of Example II. The resultant product was stable, and freely miscible in paraffinic and naphthenic lubricating oils to yield blends suitable for metal working processes.

Example IV

| | Parts |
|---|---|
| Glyceryl esters of tall oil | 87 |
| Sulphur | 13 |
| | 100 |

The above ingredients were mixed cold in a jacketed kettle provided with an agitator. With continued agitation, the charge was heated according to the program:

| | °F. |
|---|---|
| First hour | 200 |
| Next 1½ hours | 300 |
| Next 2½ hours | 320 |

The charge was then cooled to 200° F., blown with air for 2 hours, drained off, and cooled. The product had substantially the same uses and properties as the product of Example I.

From the foregoing general discussion and specific examples, it will be seen that there are provided by this invention novel sulphurized compositions, having technically desirable lubricating and anti-corrosion properties. The products may, moreover, be made from the readily procurable tall oil glycerides and sulphur, by the use of ordinary equipment and techniques.

What is specifically claimed and desired to be secured by Letters Patent is:

1. As a new composition of matter, sulphurized glyceryl esters of tall oil.

2. As a new composition of matter, sulphurized glyceryl esters of tall oil containing from about 2% to about 20% of sulphur in chemical combination therewith.

3. Process which comprises reacting the glyceryl esters of tall oil with elementary sulphur at temperatures from about 300° to about 380° F. for from about 4 to about 10 hours.

4. Process according to claim 3, in which 7% to 20% of sulphur is reacted with the glyceryl esters, and in which the sulphur is added in small portions over the initial period of the reaction.

5. Process according to claim 3, in which the sulphurized esters are subsequently blown with air.

GIFFORD D. DAVIS.
EDWIN J. BARTH.